United States Patent [19]

Takeda

[11] 4,231,220
[45] Nov. 4, 1980

[54] SECONDARY AIR CONTROL SYSTEM FOR AN INTERNAL COMBUSTION ENGINE

[75] Inventor: Keiso Takeda, Susono, Japan

[73] Assignee: Toyota Kidosha Kogyo Kabushiki Kaisha, Toyota, Japan

[21] Appl. No.: 932,189

[22] Filed: Aug. 9, 1978

[30] Foreign Application Priority Data

Aug. 17, 1977 [JP] Japan .................................. 52-97877

[51] Int. Cl.³ .......................... F01N 3/15; F01N 3/10; F02B 75/10
[52] U.S. Cl. ....................................... 60/276; 60/277; 60/289; 60/306
[58] Field of Search ................. 60/276, 289, 290, 306, 60/277

[56] References Cited

U.S. PATENT DOCUMENTS

| | | | |
|---|---|---|---|
| 3,696,618 | 10/1972 | Boyd | 60/276 |
| 3,730,157 | 5/1973 | Gerhold | 60/276 |
| 3,863,444 | 2/1975 | Nakajima | 60/289 |
| 3,974,651 | 8/1976 | Nakajima | 60/290 |
| 4,110,979 | 9/1978 | Miyagi | 60/289 |

Primary Examiner—Douglas Hart
Attorney, Agent, or Firm—Kenyon & Kenyon

[57] ABSTRACT

Disclosed is a double feedback loop type of secondary air control system for an internal combustion engine, in which a valve provided in a secondary air feed passage for regulating a quantity of the secondary air fed into an exhaust passage of the engine is operated in response to a first error signal indicative of a deviation of the actual secondary air quantity from the desired secondary air quantity and a second error signal indicative of a deviation of the actual air-fuel ratio from the desired air-fuel ratio, thereby effecting a precise control of the air-fuel ratio.

6 Claims, 5 Drawing Figures

SWITCH-A

| CATALYZER TEMP. | 650°C ⟶ 750°C | 650°C ⟵ 750°C |
|---|---|---|
| SWITCH CONNECTION | a – b | a – c |

SWITCH-B

| FIC SWITCH | ON | | OFF |
|---|---|---|---|
| ENGINE COOLANT TEMP. | < 40°C | ≥ 40°C | |
| SWITCH CONNECTION | e – g | e – h | e – f |

SECONDARY AIR CONTROL SYSTEM FOR AN INTERNAL COMBUSTION ENGINE

BACKGROUND OF THE INVENTION

1. Field of the Invention

The present invention relates to an exhaust gas purifying system for an internal combustion engine, and, more particularly, to a secondary air control system in the exhaust gas purifying system which includes a three-way catalyzer in the exhaust passage of the engine and a secondary air feed device adapted for feeding secondary air into the exhaust passage upstream of the catalyzer.

In the exhaust gas purifying system utilizing a catalyzer, the action of the catalyzer depends on the air-fuel ratio or air-fuel equivalence ratio ($\lambda$ = actual air-fuel ratio/stoichiometric air-fuel ratio); accordingly, it is necessary to control the air-fuel ratio to be within a required range for ensuring an expected effect. Particularly, for a system utilizing a three-way catalyzer, an air-fuel ratio controlled within a small range of around the stoichiometric point ($\lambda = 1$) is required. Therefore, in the above-mentioned secondary air feed type of the exhaust gas purifying system, the secondary air quantity must be controlled so that, after the feeding of the secondary air, the air-fuel ratio becomes equal to the required air-fuel ratio.

2. Description of the Prior Art

A conventional secondary air control system is of a single feedback type wherein a secondary air control valve is operated in response to an output signal of an oxygen sensor (otherwise called as a lambda sensor) installed on the exhaust passage between the secondary air feeding position and the catalyzer. However, such type of control system has the drawback of not being able to effect a precise control of the secondary air quantity and, accordingly, of the air-fuel ratio, due to the reason mentioned below.

Generally, for feeding secondary air in the exhaust gas purifying system, an air pump driven by the engine is used. A characteristic of the conventional air pump resides in that its delivery flow rate varies linearly in proportion to the engine speed, but such rate does not substantially vary with respect to the engine load. Another characteristic of the air pump resides in that its delivery flow rate is generally set so that a sufficient quantity of secondary air can be obtained when the engine is in a high load operation. Accordingly, the air-fuel ratio varies in accordance with the engine load condition, in such a manner that it is made leaner with the excess secondary air when the engine is in a low load operation. The variation of the air-fuel ratio is detected by the oxygen sensor, and is controlled by the feedback control system. However, this feedback control system has a response lag which is caused by a lag in the transfer of the secondary air from the secondary air feeding position to the oxygen sensor (the lag in the transfer of the secondary air is relatively large during the low load operation of the engine) and by a lag in the operation of the secondary air valve. Accordingly, the air-fuel ratio fluctuates within a relatively large amplitude, and an effective purifying performance thus cannot be achieved.

SUMMARY OF THE INVENTION

It is, therefore, an object of the present invention to provide a secondary air control system which can effect a precise control of the air-fuel ratio in the aforementioned type of exhaust gas purifying system.

Another object of the present invention is to provide a secondary air control system which can control the secondary air quantity in relation to various parameters representative of the engine operation.

A secondary air control system according to the present invention comprises a control valve adapted to regulate the flow rate of the secondary air fed therethrough, a valve actuator for operating the secondary air control valve, and means for generating a first error signal indicative of deviation of an actual secondary air quantity from a desired secondary air quantity and for generating a second error signal indicative of deviation of an actual air-fuel ratio from a desired air-fuel ratio, in which the valve actuator is controlled in response to the first and second error signals. The desired secondary air quantity is defined by the following factors, i.e., the quantity of intake air supplied into the engine via a carburetor, the basic air-fuel ratio set by the carburetor and the desired air-fuel ratio for the catalyzer.

In this system, the secondary air quantity is primarily regulated by the first error signal and, furthermore, corrected by the second error signal, whereby the air-fuel ratio can be precisely controlled.

The error signal generating means may be constructed from known elements for detecting parameters representative of the actual secondary air quantity, the intake air quantity and the actual air-fuel ratio, and from an electrical control unit or computer.

The secondary air control system according to the present invention can preferably comprise additional elements for detecting various parameters representative of the engine operating condition, for example, an engine speed sensor, an engine temperature (coolant temperature) sensor, a catalyzer temperature sensor, a fast idle cam sensor, etc., so as to effect control in response to the various engine operating conditions.

The present invention will be more apparent from the description of a preferable embodiment of the invention as set forth below, with reference to the accompanying drawings.

DESCRIPTION OF THE PREFERRED EMBODIMENTS

Figure 1:
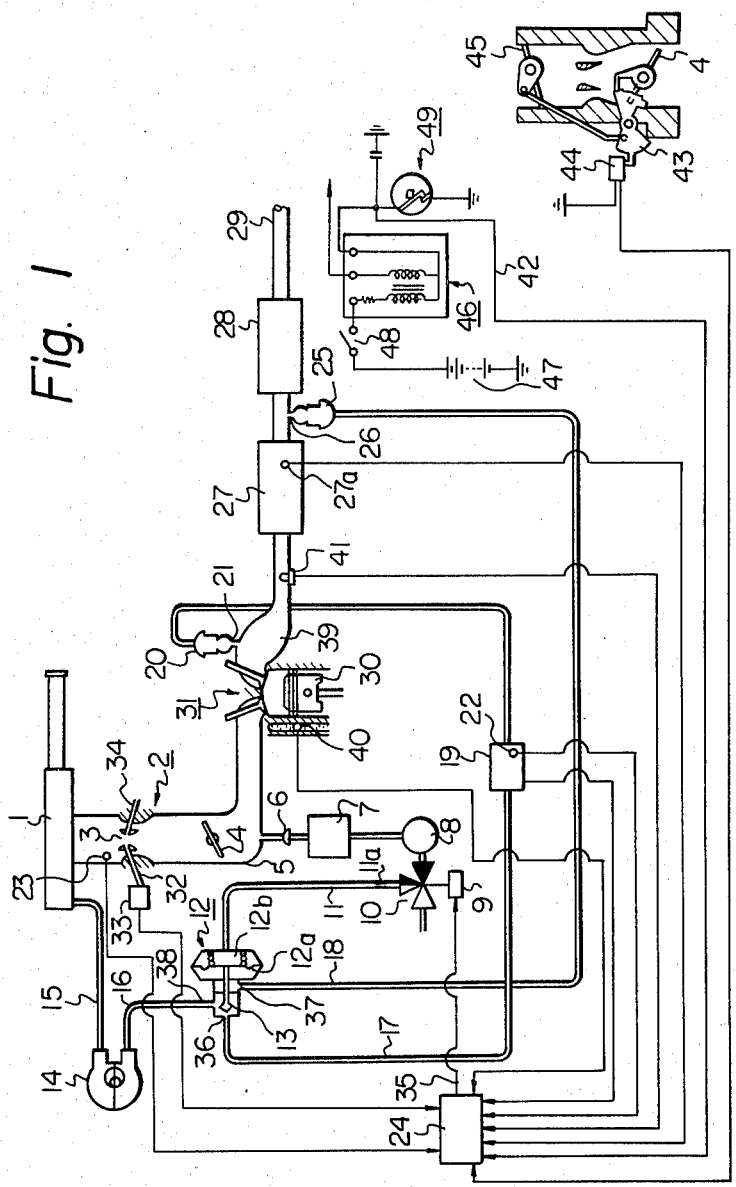
FIG. 1 diagrammatically illustrates an exhaust gas purifying system of an internal combustion engine using an embodiment of a secondary air control system according to the present invention.

Referring to FIG. 1, an exhaust gas purifying system will be generally described. A three-way catalytic converter 27 and an oxidation catalytic converter 28 are installed on an exhaust pipe 29 of an engine 31 in that order upstream of the exhaust pipe. An air pump 14, which is used for feeding secondary air into the exhaust pipe, is connected to an air cleaner 1 via a suction pipe 15 and also connected to an inlet 38 of a diaphragm type of secondary air control valve 12 via a delivery pipe 16.

An outlet 36 of the valve 12 is connected, via a secondary air feed pipe 19 and a check valve 20, to a secondary air injection nozzle 21 installed on an exhaust manifold 39 of the engine. A relief port 37 of the valve 12 is connected, via a relief pipe 18 and a check valve 25, to a secondary air injection nozzle 26 which is installed on the exhaust pipe 39 upstream of the oxidation catalytic converter 28.

The construction of a secondary air control system according to the present invention will now be described. The valve 12 has a valve element 13 which is secured to a diaphragm 12a for the purpose of regulating the opening of the outlet 36. A diaphragm chamber 12b of the valve 12 is connected, via a conduit 11, to an intake manifold 5 of the engine. The conduit 11 is provided therein with a check valve 6, a vacuum reservoir 7, a regulator 8, a three-way valve 10 and an orifice 11a. The three-way valve 10 is actuated by an actuator 9 (preferably, an electromagnetic actuator) so as to selectively open and close the conduit 11 with respect to the open air (atmosphere).

A carburetor 2 of the engine is provided with a conduit 32 and a vacuum sensor 33, which are used to detect a small venturi vacuum in the carburetor, and a thermo-sensor 23 used for detecting the intake air temperature. Numeral 34 refers to a main fuel nozzle. The secondary air feed pipe 17 is provided therein with an air flow meter 19 used for measuring the flow rate of the secondary air fed through the feed pipe, and a thermo-sensor 22 used for detecting the secondary air temperature. An oxygen sensor 41 used for detecting the air-fuel ratio (or equivalence ratio $\lambda$) is installed on the exhaust pipe 29 between the secondary air injection nozzle 21 and the three-way catalytic converter 27.

The control system illustrated in FIG. 1 further comprises a thermo-sensor 40 used for detecting the temperature of the engine coolant, a thermo-sensor 27a used for detecting the temperature of the three-way catalytic converter 27, a line 42 adapted to deliver a signal indicative of the engine speed, and a fast idle cam switch 44. Furthermore, FIG. 1 illustrates a throttle valve 4, a fast idle cam 43, a choke valve 45, an ignition coil 46, a battery 47, an ignition switch 46, and an ignition control system 49.

The above-described sensors and elements 19, 22, 23, 27a, 33, 40, 41, 42 and 44 are electrically connected to input terminals of an electrical control unit or computer 24, and an output line 35 of the computer 24 is electrically connected to the actuator 9 of the three-way valve 10.

The operation of the above-described secondary air control system will now be described with reference to FIGS. 2 through 3. This control system can effect a variety of functions which are separately described below.

I. Main Function (Control of the Air-fuel Ratio)

First a quantity of intake air supplied into the engine via the carburetor 2 is measured, and then a desired secondary air quantity is calculated in accordance with the measured intake air quantity. In FIG. 2, numeral 101 designates an intake air quantity measuring section. The intake air quantity Ga is calculated in accordance with the output signals of the vacuum sensor 33 and the intake air temperature sensor 23, by means of the equation (1), set forth below, which is programmed into the computer 24.

$$Ga = K_1 \sqrt{A \cdot V_1} \qquad (1)$$
$$K_1 = C_1 \cdot \frac{273.15}{273.15 + T_1}$$

where
A, $C_1$ = Constant coefficients
$V_1$ = output signal of the vacuum sensor 33 (i.e., small venturi vacuum)
$T_1$ = output signal of the intake air temperature sensor 23.

The desired secondary air quantity $G_{2a}$ is calculated by means of the equation (2), set forth below, which is programmed into the computer 24.

$$G_{2a} = ((\lambda 0/\lambda b) - 1)Ga \qquad (2)$$

where
$\lambda o$ = equivalence ratio corresponding O to a desired air-fuel ratio ($\lambda o = 1$ for the three-way catalyzer)
$\lambda b$ = equivalence ratio corresponding to a basic air-fuel ratio.

It should be noted that the basic air-fuel ratio is defined as an air-fuel ratio of the intake air-fuel mixture and that such ratio is preset in the carburetor. For the present system, it is desirable to use a carburetor which is adjusted to exhibit such an air-fuel ratio characteristic that the basic air-fuel ratio is richer than the stoichiometric air-fuel ratio (i.e., $\lambda b < 1$) and the amplitude of fluctuation of the basic air-fuel ratio in relation to the fluctuation of the intake air quantity is small. Alternatively, if a carburetor having the above-mentioned air-fuel ratio characteristic cannot be used, $\lambda b$ may be programed into the computer as a function of the intake air quantity.

Meanwhile, an actual quantity of the secondary air fed into the exhaust manifold through the feed pipe 17 is measured. In FIG. 2, numeral 102 designates an actual secondary air quantity measuring section. The actual secondary air quantity $G_{2a'}$ is calculated in accordance with the output signals of the air flow meter 19 and the secondary air temperature sensor 22, by means of the equation (3), set forth below, which is programed into the computer 24.

$$G_{2a'} = K_2 \cdot V_2 \qquad (3)$$
$$K_2 = G_2 \cdot \frac{273.15}{273.15 + T_2}$$

where
$C_2$ = constant coefficient
$V_2$ = output signal of the air-flow meter 19 (i.e., secondary air-flow rate)
$T_2$ = output signal of the secondary air temperature sensor 22.

The actual secondary air quantity $G_{2a'}$ is compared with the desired secondary air quantity $G_{2a}$, in order to generate an error signal which is indicative of a deviaton of $G_{2a'}$ from $G_{2a}$. This error signal is fed to the actuator 9 to operate the three-way valve 10 (FIG. 1), whereby the control valve 12 (FIG. 1) is adjusted so that the secondary air quantity is regulated to the desired secondary air quantity.

Furthermore, a control section designated by numeral 103 generates a second error signal. That is, the output signal of the oxygen sensor 41 which indicates an actual air-fuel ratio is compared with a reference signal indicative of the desired air-fuel ratio (λo=1), so as to generate an error signal indicative of a deviation of the actual air-fuel ratio from the desired air fuel ratio. This second error signal is fed into the actuator 9 to correct the secondary air quantity so as to obtain the desired air-fuel ratio.

In this way, the secondary air quantity is primarily regulated to the desired secondary air quantity in accordance with the first error signal and is then corrected according to the second error signal. Therefore, the quantity of secondary air to be regulated in the air-fuel ratio feedback control (or the oxygen sensor feedback control) can be minimized and, accordingly, the lag of response of the control system is also minimized. Consequently, the precise control of the air-fuel ratio in which the amplitude of fluctuation is very small can be achieved.

II. Auxiliary Function

A. Prevention of Overheating of the Catalyzer

When the catalyzer temperature rises higher than a predetermined temperature (for example, 750° C.), it is preferable to interrupt the air-fuel ratio feedback control effected by the control section 103, while effecting another optimum control in order to prevent the catalyzer from being overheated. The first example of such control is a feedback control utilizing the catalyzer temperature sensor 27a, which is effected by a control section designated by numeral 104 in FIG. 2. In this control section, the output signal of the catalyzer temperature sensor 27a is compared with a reference signal which indicates a desired catalyzer temperature (for example, 700° C.), so as to generate an error signal indicative of a deviation of the actual catalyzer temperature from the desired catalyzer temperature.

The control section 104 is connected to the switch A which is responsive to the output signal of the catalyzer temperature sensor 27a. As shown in FIG. 2A, when the temperature of the catalytic converter 27 is lower than 750° C., the switch A will be switched to a position in which the terminal "a" is connected to the terminal "b", whereby the air-fuel ratio feedback control is effected by the control section 103. When the catalyzer temperature rises higher than 750° C., then the switch A is switched over so that the terminal "a" is connected to the terminal "c", whereby the catalyzer temperature feedback control is effected by the control section 104. When the catalyzer temperature decreases to a predetermined temperature (for example, 650° C.), then the switch A is switched over so that the terminal "a" is connected to the terminal "b", whereby the air-fuel feedback control is started again.

Figure 2:
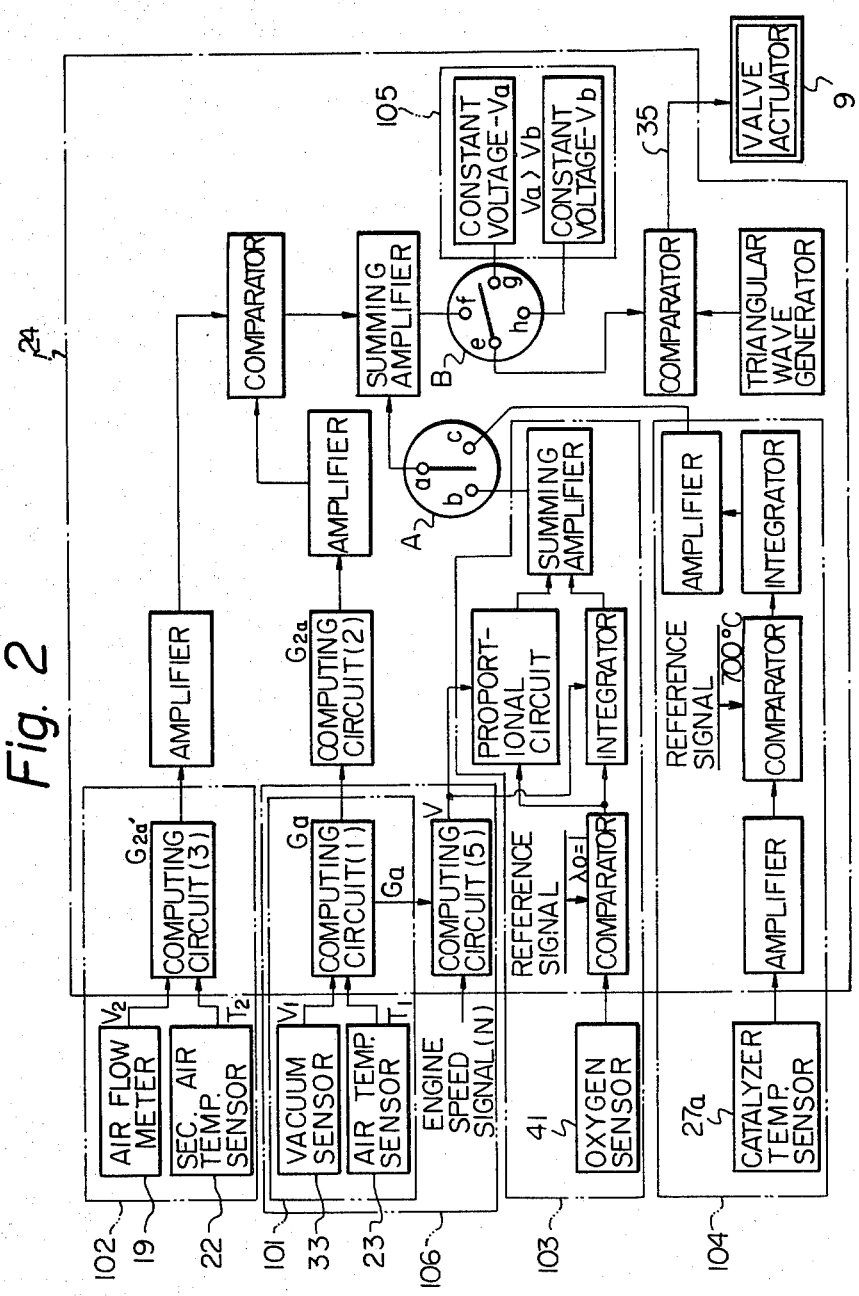
FIG. 2 is a block diagram of the secondary air control system.
Figures 2A, 2B, 3:
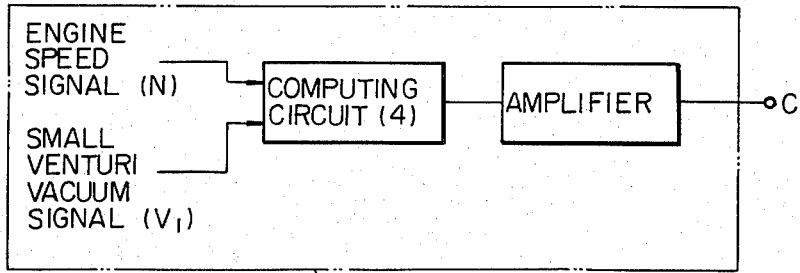
FIGS. 2A and 2B illustrate the respective operations of the switches "A" and "B" illustrated in FIG. 2.
FIG. 3 is a block diagram of another control loop which can replace the catalyzer temperature feedback control loop illustrated in FIG. 2.

A second example of the above-mentioned optimum control is a program control which is effected by a control section generally designated by the numeral 104a in FIG. 3. This control section generates a signal indicative of an optimum secondary air quantity for the engine operation, which is determined by the engine speed and the engine load. This optimum secondary air quantity G$_{2a}''$ is calculated by means of the equation (4) set forth below.

$$G_{2a}'' = K_3' \cdot f(V_1)/f(N) \qquad (4)$$

where $K_3$ = constant coefficient $f(V_1)$ = a function with respect to the small venturi vacuum $f(N)$ = a function with respect to the engine-speed (engine revolution number).

B. Prevention of Overheating of the Catalyzer during Warming-up of the Engine Well known in the art is a method for defecting the temperature of the engine coolant and, when the engine is cold, for feeding an increased secondary air quantity to accelerate the oxidation reaction in the exhaust manifold as well as the warming-up of the catalyzer. However, this method exhibits the following problem, i.e., if the engine is left in fast idle condition, the air-fuel ratio feedback control is caused to go into operation, and the catalyzer temperature is thus caused to rise abnormally. This problem can be solved by the control effected by a control section designated by the numeral 105 in FIG. 2, as described below. The control section 105 includes two electrical sources having two different voltages Va and Vb (Va>Vb), respectively. The control section 105 is connected to a switch B, which is responsive to the output signals of the fast idle cam switch (FIC switch) and the engine coolant temperature sensor 40 (FIG. 1). As shown in FIGS. 2 and 2B, when the fast idle cam switch is "ON", the switch B is switched over so that the terminal "e" is disconnected from the terminal "f" so as to interrupt the feedback control effected by the control sections 101, 102, 103 and 104 (or 104a). Then, if the engine coolant temperature is lower than, for example, 40° C., the switch terminal "e" is connected to the terminal "g", that is, to the higher voltage Va of the control section 105, so that the valve actuator 9 can be operated to feed a large secondary air quantity for accelerating the warm-up of the catalyzer. On the other hand, if the engine coolant temperature rises equal to or higher than, for example, 40° C., the terminal "e" will become connected to the terminal "h", that is, to the lower voltage Vb of the control section 105, so that the valve actuator 9 can be operated to remarkably cut the flow of secondary air for preventing overheating of the catalyzer. In this case, it is not desirable to fully cut the flow of the secondary air, because the purifying action of the catalyzer will be sharply decreased and the catalytic converter will discharge an undesirable exhaust gas smell. When the fast idle cam switch 44 is turned "OFF", the switch B is switched over so that the terminal "e" is connected to the terminal "f", whereby the feedback control is effected again.

It should be noted that, in the above-described case wherein the fast idle cam switch is "ON" and the engine coolant is higher than 40° C., it is possible to effect either a temperature feedback control or a program control similar to those described in item II-A hereinbefore, instead of effecting the above-described control by means of the control section 105.

C. Control of Operating Speed of Secondary Air Control Valve

When the engine speed is increased, the quantity of air delivered by means of the air pump 14 is also increased. Accordingly, even if the operating speed of the control valve is maintained constant, the higher the engine speed is increased, the higher the changing rate (i.e., the time rate of the change) of the secondary air becomes. However, in the case wherein the engine speed is maintained constant and only the engine load is changed, if the valve operating speed is constant, the changing rate of the secondary air quantity will be maintained approximately constant, although this changing rate will be decreased due to the lowering of the pump efficiency during the high load operation. On the contrary, it is required that the changing rate of the secondary air quantity increases or decreases in response to the increase or decrease of the intake air quantity. Therefore, it is necessary to increase or decrease the changing rate of the secondary air quantity in response to the increase or decrease of the engine load for improving the accuracy of the secondary air control. Since the air pump is generally designed so that a sufficient secondary air quantity can be obtained during the high load operation of the engine, the changing rate of the secondary air quantity, i.e., the valve operating speed should be lowered in accordance with the reduction of the engine load.

This type of control can be effected by a control section designated by the numeral 106 in FIG. 2. It should be noted that the secondary air control valve 12 should preferably be of a pulse-motor operated type, rather than of the diaphragm operated type utilized in the embodiment illustrated hereinbefore.

The optimum valve operating speed V is calculated by means of the equation (5), set forth below, which is programed into the computer 24.

$$\left.\begin{array}{l} V = V_o - V_4 \\ V_4 = K_4 - \dfrac{Ga}{N} \end{array}\right\} \quad (5)$$

where
- $V_o$ = an optimum valve operating speed for a load condition in which the intake vacuum is $-100$ mmHg (However, $V_o$ is maintained constant when the load is higher than that corresponding to $-100$ mmHg)
- $Ga$ = intake air quantity calculated by means of the aforementioned equation (1)
- $N$ = engine revolution number
- $K_4$ = constant value equal to $Ga/N$ in the load condition in which the intake vacuum is $-100$ mmHg (in the case where $V_4 \geqq 0$, V is maintained constant and equal to $V_o$).

Namely, when the engine load is higher than the load condition in which the intake vacuum is $-100$ mmHg, the valve operating speed V is maintained at the constant speed $V_o$, and when the engine load is lower than the load condition in which the intake vacuum is $-100$ mmHg, the valve operating speed is decreased in response to the reduction of the engine load. The signal indicative of the optimum valve operating speed V is combined with the second error signal delivered from the control section 103, so as to provide a modified second error signal.

As will be apparent from the foregoing description, the secondary air control system can effect a precise control and, in addition, permit the secondary air quantity to be controlled in response to various engine operating conditions.

It should be understood that the invention is not limited to the above-mentioned embodiment, but can be modified within the scope of the appended claims.

What is claimed is:

1. A secondary air control system in an exhaust gas purifying system for an internal combustion engine including a three-way catalyzer in an exhaust passage of the engine and a secondary air feed device for feeding secondary air via a secondary air passage into said exhaust passage upstream of said catalyzer, said secondary air control system comprising:
   - a control valve in said secondary air passage for regulating the flow rate of the secondary air fed therethrough;
   - means for generating a signal indicative of a desired quantity of the secondary air determined by the quantity of an intake air supplied into the engine via a carburetor, the basic air-fuel ratio set by said carburetor and the desired air-fuel ratio for said catalyzer;
   - first feedback means for generating a signal indicative of an actual quantity of the secondary air fed via said secondary air valve;
   - means for generating a signal indicative of the desired air-fuel ratio;
   - second feed back means for generating a signal indicative of an actual air-fuel ratio in the exhaust passage between the secondary air feeding position and said catalyzer;
   - means responsive to said actual secondary air quantity signal and said desired secondary air quantity signal for generating a first error signal indicative of a deviation of the actual secondary air quantity from the desired secondary air quantity;
   - means responsive to said actual air-fuel ratio signal and said desired air-fuel ratio signal for generating a second error signal indicative of a deviation of the actual air-fuel ratio from the desired air-fuel ratio; and
   - actuator means responsive to said first and second error signals for operating said secondary air valve, said system further comprising means for generating an auxiliary signal, and signal selector means responsive to a temperature of said catalyzer for interrupting the feeding of said second error signal to said actuator means when the catalyzer temperature rises higher than a predetermined temperature, while feeding said auxiliary signal to said actuator means, so as to effect the secondary air control to prevent said catalyzer from being overheated.

2. A secondary air control system according to claim 1, wherein said auxiliary signal generating means comprises means for generating a signal indicative of deviation of an actual catalyzer temperature from a desired catalyzer temperature.

3. A secondary air control system according to claim 1, wherein said auxiliary signal generating means comprises means for generating a signal indicative of an optimum secondary air quantity determined by the engine load and the engine speed.

4. A secondary air control system according to claim 1, further comprising means for generating an auxiliary control signal, and signal selector means responsive to an engine idle condition for interrupting the feeding of said first and second error signals into said actuator means when the engine is in the fast idle condition, while feeding said auxiliary control signal to said actuator means, so as to effect the secondary air control to accelerate the warm-up of said catalyzer.

5. A secondary air control system according to claim 4, wherein said auxiliary control signal generating means comprises means for generating first and second signals indicative of large and small secondary air quantities, respectively, and said signal selector means comprises means responsive to the temperature of an engine coolant for selectively delivering one of said first and second signals as said auxiliary control signal, when said engine coolant temperature is lower or higher than a predetermined temperature, respectively, so as to prevent the catalyzer from being overheated.

6. A secondary air control system, according to claim 4, wherein said secondary air feed device comprises an air pump driven by the engine to deliver the secondary air having a quantity in proportion to the engine speed, and said secondary air control system further comprising means for generating a signal indicative of a desired operating speed of said control valve determined by the engine load and the engine speed, and means for combining said desired control valve operating speed signal with said second error signal to generate a modified second error signal.

* * * * *

UNITED STATES PATENT AND TRADEMARK OFFICE
CERTIFICATE OF CORRECTION

PATENT NO. : 4,231,220
DATED : November 4, 1980
INVENTOR(S) : Keiso Takeda

It is certified that error appears in the above—identified patent and that said Letters Patent is hereby corrected as shown below:

On page 1 of patent document, correct spelling of assignee's name from "Toyota Kidosha Kogyo Kabushiki Kaisha" to --Toyota Jidosha Kogyo Kabushiki Kaisha--.

Col. 4, line 21, delete "O".

Signed and Sealed this

Sixteenth Day of June 1981

[SEAL]

*Attest:*

RENE D. TEGTMEYER

*Attesting Officer*  *Acting Commissioner of Patents and Trademarks*